United States Patent
Roozen et al.

(10) Patent No.: US 11,197,494 B2
(45) Date of Patent: Dec. 14, 2021

(54) LACTATE POWDER AND METHOD FOR THE PREPARATION THEREOF

(71) Applicant: Purac Biochem B.V., Gorinchem (NL)

(72) Inventors: Lambertus Henricus Elisabeth Roozen, Gorinchem (NL); Gerrit Anthon Rene Hilhorst, Gorinchem (NL); Heny Kusumawardani, Papendrecht (NL); Apostolos Papageorgiou, Gorinchem (NL); Kees Van Der Voort Maarschalk, Wijchen (NL)

(73) Assignee: PURAC BIOCHEM B.V., Gorinchem (NL)

( * ) Notice: Subject to any disclaimer, the term of this patent is extended or adjusted under 35 U.S.C. 154(b) by 69 days.

(21) Appl. No.: 16/839,970

(22) Filed: Apr. 3, 2020

(65) Prior Publication Data
US 2020/0229479 A1   Jul. 23, 2020

Related U.S. Application Data

(63) Continuation of application No. PCT/EP2018/076979, filed on Oct. 4, 2018.

(30) Foreign Application Priority Data

Oct. 5, 2017  (EP) .................................. 17194983

(51) Int. Cl.
*A23L 33/16* (2016.01)
*A23P 20/18* (2016.01)

(52) U.S. Cl.
CPC .............. *A23L 33/16* (2016.08); *A23P 20/18* (2016.08); *A23V 2002/00* (2013.01)

(58) Field of Classification Search
CPC .......... A23L 33/16; A23P 20/18; A23P 10/30; A23P 10/35; A23P 10/40; A23P 10/43; A23P 20/00; A23V 2002/00; Y10T 428/2991; A61K 8/11
USPC ......................................................... 514/970
See application file for complete search history.

(56) References Cited

U.S. PATENT DOCUMENTS

| | | | |
|---|---|---|---|
| 4,537,784 | A | 8/1985 | Percel et al. |
| 2009/0214740 | A1 | 8/2009 | Cruz et al. |
| 2011/0052772 | A1 | 3/2011 | Schnee |
| 2015/0150835 | A1 | 6/2015 | Maarschal et al. |

FOREIGN PATENT DOCUMENTS

| EP | 1 616 851 A1 | 1/2006 |
|---|---|---|
| EP | 2 945 497 A1 | 11/2015 |

OTHER PUBLICATIONS

International Search Report received in corresponding International Application No. PCT/EP2018/076979 dated Jan. 18, 2019, 4 pages.

*Primary Examiner* — Erik Kashnikow
*Assistant Examiner* — Lela S. Williams
(74) *Attorney, Agent, or Firm* — Foley & Lardner LLP

(57) ABSTRACT

The invention relates to a particulate product comprising at least 10 wt. % of the coated lactate particles having the following characteristics:
- comprising one or more carrier particles containing at least 80 wt. % of calcium lactate component selected from calcium lactate hydrates, calcium lactate anhydrous and combinations thereof;
- comprising a coating layer that covers the one or more carrier particles, said coating layer containing at least 60 wt. % of sodium lactate;
- containing sodium and calcium in a molar ratio of 2.1:1 to 5:1; and
- a particle size in the range of 120 to 1,200 µm.

The coated lactate particles in the particulate product are very stable, even though the sodium lactate in the coating layer is in direct contact with the surrounding atmosphere. The particulate product can suitably be used in the preparation of foodstuffs and beverages.

19 Claims, No Drawings

LACTATE POWDER AND METHOD FOR THE PREPARATION THEREOF

CROSS-REFERENCE TO RELATED APPLICATIONS

This application is a continuation of International Application No. PCT/EP2018/076979, filed Oct. 4, 2018, which claims the benefit of and priority to European Application No. 17194983.7, filed Oct. 5, 2017, both of which are hereby incorporated by reference herein in their entireties.

TECHNICAL FIELD OF THE INVENTION

The invention relates to a stable lactate powder, more particularly to a lactate powder that is composed of coated lactate particles comprising one or more carrier particles containing calcium lactate and a coating layer containing sodium lactate. The lactate powder of the present invention is easy to handle (free flowing) and exhibits high stability.

The invention also relates to blends of the aforementioned lactate powder and other particulate ingredients. In addition, the invention relates to the use of the lactate powder and of blends containing said lactate powder in the preparation of foodstuffs or beverages. Finally, the invention provides a process for the manufacture of the lactate powder.

BACKGROUND OF THE INVENTION

Commercially available sodium lactate is usually produced by fermentation of a sugar source, followed by neutralization of the resulting lactic acid to create a salt having the formula $NaC_3H_5O_3$. Sodium lactate can be applied as a food preservative, a flavor enhancer, an acidity regulator, a humectant or skin moisturizer.

Sodium lactate can be applied in meat products to prevent microbial growth, to delay the development of off-flavors, to improve cook yields of meat products, and to stabilize meat color.

For many commercial applications it is preferred that sodium lactate is provided in dry particulate form. However, due to its high hygroscopicity, pure sodium lactate powder is insufficiently stable for many applications. Furthermore, production of pure sodium lactate powder is laborious.

US 2009/0214740 describes a method for the preparation of a stable alkali metal lactate in powder form, comprising processing at a starting temperature of 130° C. to 170° C., an aqueous concentrate of 60-100% (m/m) alkali metal lactate cooling the alkali metal lactate to form a powder of the alkali metal lactate, wherein
the processing and cooling is performed in a mixer/extruder; and
the alkali metal lactate is combined with a carrier before or after processing US 2011/0052772 describes a foodstuff treatment composition, particularly for the treatment of meat, meat products, fish and seafood products. The treatment composition comprises a combination of (i) sodium lactate and/or potassium lactate and (ii) at least one sodium and/or potassium phosphate salt, and the composition is in the form of a powder, granules, a slurry or a paste. Also described is a method of preparing the foodstuff treatment composition, comprising the steps of:
a) preparing an aqueous solution of sodium lactate and/or potassium lactate comprising 40 to 80 wt. % lactate;
b) combining 0.5 to 1.5 weight parts of the aqueous lactate solution of step a) with 2.0 weight parts of the at least one sodium and/or potassium phosphate salt.

US 2015/0150835 describes a lactate powder having a lactate content of at least 20 wt. % and a water content of less than 3.5 wt. %, the powder comprising cationic calcium and cationic sodium in a total amount in excess of 50% of the stoichiometric amount with regard to lactate, wherein the calcium and sodium are present in a molar ratio within the range of 0.1-5. Also described is a method of producing such a lactate powder, comprising the steps of:
obtaining an aqueous liquid comprising a stoichiometric mixture of lactate and metal cations comprising calcium ions and sodium ions, wherein the calcium and sodium ions are present in a molar ratio within the range of 0.1-5; and
drying the liquid to a water content of less than 3.5 wt. %.

EP 1 616 851 relates to a method for the preparation of a stable lactate metal salt in powder form, wherein:
a) a concentrate that contains lactate metal salt is processed, under cooling, in a mixer/extruder to form a powder of the lactate metal salt, and
b) subsequently the powder of the lactate metal salt is partially encapsulated by means of an encapsulating agent to form a partially encapsulated lactate metal salt powder.

The encapsulation agent is applied in an amount of 1-15% by weight of the total partially encapsulated lactate metal salt powder. Suitable encapsulating agents may be chosen from hydrogenated oil, fat, wax, carbohydrates such as anti-oxidants and sugars, proteins, polymers, or mixtures thereof.

U.S. Pat. No. 4,537,784 describes a process for making a particulate food acidulant comprising calcium lactate carrier, lactic acid, and lipid coating comprising the steps of:
plating lactic acid onto particulate calcium lactate carrier by spray applying said lactic acid onto said calcium lactate carrier, while said carrier is in the form of a fluid bed; and then
encapsulating said carrier and acid by spray coating said carrier and acid with a molten edible lipid.

SUMMARY OF THE INVENTION

The inventors have developed a process that enables the production of a free flowing powder that is composed of lactate particles that largely consist of sodium lactate, and that exhibits excellent stability. More particularly, the inventors have developed a method that enables the production of coated lactate particles having the following characteristics:
comprising one or more carrier particles containing at least 80 wt. % of calcium lactate component selected from calcium lactate hydrates, calcium lactate anhydrous and combinations thereof;
comprising a coating layer that covers the one or more carrier particles, said coating layer containing at least 60 wt. % of sodium lactate;
containing sodium and calcium in a molar ratio of 2.1:1 to 5:1; and
a particle size in the range of 120 to 1,200 μm.

Accordingly, a first aspect of the invention relates to a particulate product comprising at least 10 wt. % of these coated lactate particles. The particulate product of the present invention can be provided in the form of a powder that consists of coated lactate particles. Alternatively, the particulate product may be provided in the form of a blend of these coated lactate particles and one or more other particulate ingredients.

The inventors have surprisingly found that the coated lactate particles of the present invention are very stable, even though the sodium lactate in the coating layer is in direct contact with the surrounding atmosphere.

Another aspect of the invention relates to a method of preparing a foodstuff or a beverage, said method comprising incorporating the aforementioned particulate product in a concentration of 0.1 to 10% by weight of the foodstuff or beverage.

Yet another aspect of the invention relates to a process of producing the particulate product of the present invention, said process comprising:
  providing a fluidized bed of carrier particles containing at least 80 wt. % of calcium lactate component selected from calcium lactate hydrates, calcium lactate anhydrous and combinations thereof;
  spray coating the carrier particles by spraying the fluidized bed with an aqueous liquid containing at least 30 wt. % sodium lactate; and
  drying the spray coated carrier particles.

The aforementioned process offers the advantage that it yields a particulate lactate powder having the favourable properties described above. In addition, the process is simple in that the lactate powder can be produced in a single process step using a fluid bed granulator. In contrast thereto, the extrusion processes described in US 2009/021470 and EP-A 1 616 851 require multiple processing steps using various equipment, such as an evaporator, a mill, an extruder and a mixer.

DETAILED DESCRIPTION OF THE INVENTION

As already mentioned above, a first aspect of the invention concerns a particulate product comprising at least 10 wt. % of the coated lactate particles having the following characteristics:
  comprising one or more carrier particles containing at least 80 wt. % of calcium lactate component selected from calcium lactate hydrates, calcium lactate anhydrous and combinations thereof;
  comprising a coating layer that covers the one or more carrier particles, said coating layer containing at least 60 wt. % of sodium lactate;
  containing sodium and calcium in a molar ratio of 2.1:1 to 5:1; and
  a particle size in the range of 120 to 1,200 μm.

The term 'particulate product' as used herein refers to a product that is composed of particles, such as a powder or a granulate.

The term 'calcium lactate' as used herein, unless indicated otherwise, encompasses both hydrates of calcium lactate and anhydrous calcium lactate ($CaC_6H_{10}O_6$).

The term 'sodium lactate' as used herein refers to sodium lactate anhydrous ($NaC_3H_5O_3$).

Whenever reference is made herein to 'the coated lactate particles', unless indicated otherwise, what are meant are the coated lactate particles having the characteristics as specified above or preferred embodiments of these coated lactate particles as specified herein.

Whenever reference is made herein to the particle size of a particle, unless indicated otherwise, this particle size is the particle size measured using laser diffraction (Malvern Mastersizer 2000).

The coated lactate particles of the present invention preferably have a water content of less than 3.5 wt. %, more preferably of less than 3.0 wt. % and most preferably of less than 2.5 wt. %. Whenever reference is made herein to the water content of a material, this is the water content as typically measured by means of the Karl Fischer titration method, including crystal water that is contained in hydrates, such as calcium lactate pentahydrate ($C_6H_{10}CaO_6.5H_2O$).

The water content of the particulate product of the present invention typically is less than 8 wt. %, preferably less than 6 wt. % and more preferably less than 4 wt. %, and most preferably less than 2.5 wt %. Here the water content of the particulate product includes the water that is contained in the coated lactate particles.

In a preferred embodiment, the particulate product contains at least 20 wt. %, more preferably at 50 wt. %, even more preferably at least 80 wt. % and most preferably at least 90 wt. % of the coated lactate particles.

Besides the coated lactate particles, the particulate product may suitably contain one or more other particulate ingredients.

According to a preferred embodiment, the particulate product additionally contains 10 wt. % of acetate particles containing at least 80 wt. % of alkali metal acetate.

According to another preferred embodiment, the particulate product additionally contains 10 wt. % of propionate particles containing at least 80 wt. % of alkali metal propionate.

The combination of coated lactate particles, acetate particles and propionate particles preferably constitutes at least 50 wt. %, more preferably at least 80 wt. % and most preferably at least 90 wt. % of the particulate product.

The coated lactate particles according to the present invention have a particle size in the range of 120 to 1,200 μm, preferably in the range of 150 to 1100 μm, more preferably in the range of 200 to 1000 μm.

According to another preferred embodiment, the coated lactate particles have an average diameter D[4,3] in the range of 200 to 800 μm, more preferably in the range of 250 to 750 μm and most preferably in the range of 300 to 700 μm. Here the 'average diameter D[4,3]' refers to the de Brouckere mean diameter or volume mean diameter and can be defined as the weighted average volume, assuming spherical particles of the same volume as the actual particles. This average diameter is calculated by means of the following equation:

$$D[4,3] = \frac{\sum (n_i D_i^4)}{\sum (n_i D_i^3)}$$

wherein:
  $D_i$=mean particle size in size class i;
  $n_i$=number of particles in size class i The particulate product of the present invention preferably has a bulk density in the range of 0.40-0.95 g/ml, more preferably in the range of 0.0.45-0.90 g/ml and most preferably in the range of 0.50-0.85 g/ml. The term 'bulk density' as used herein refers to the mass of a quantity of the particulate product divided by the total volume that is occupied by said quantity. The total volume includes particle volume, inter-particle void volume, and internal pore volume. The bulk density referred to herein is the "tapped" density, i.e. the bulk density of the product after being mechanically tapped until there are no further changes in volume (nominal count of minimum 180 taps).

The one or more carrier particles within the coated lactate particles preferably contain at least 50 wt. %, more preferably at least 80 wt. % and most preferably at least 90 wt. % of calcium lactate hydrate.

According to a particularly preferred embodiment, the carrier particles contain a substantial amount of calcium lactate. Accordingly in a preferred embodiment, the carrier particles contain at least 50 wt. % calcium lactate. Even more preferably, the carrier particles contain at least 80 wt. %, most preferably at least 90 wt. % of calcium lactate.

The coating layer of the coated lactate particles preferably contains at least 70 wt. %, more preferably at least 80 wt. % and most preferably at least 90 wt. % of sodium lactate.

The coated lactate particles of the present invention may contain one or more additional coating layers besides the coating layer containing the at least 60 wt. % sodium lactate. The benefits of the present invention, however, are particularly appreciated in case the coated lactate particles contain no additional coating layers.

In another preferred embodiment, sodium and calcium are present in the coated lactate particles in a molar ratio of 2.1:1 to 4.2:1.

The total amount of sodium in the coated lactate particles is preferably in the range of 10-20 wt. %, more preferably in the range of 11-18 wt. %.

The total amount of calcium in the coated lactate particles is preferably in the range of 2-10 wt. %, more preferably in the range of 2.5-8 wt. %.

The total amount of lactate in the coated lactate particles is preferably in the range of 75-83 wt. %, more preferably of 77-82 wt. %. Here the 'total amount of lactate' refers to the total amount of lactic acids residue, including the water that is contained in calcium lactate hydrates.

According to a preferred embodiment, the combination of calcium lactate component and sodium lactate constitutes at least 80 wt. %, preferably at least 90 wt. % of the coated lactate particles.

The combination of calcium lactate and sodium lactate preferably constitutes at least 70 wt. %, more preferably at least 80 wt. %, preferably at least 90 wt. % of the coated lactate particles.

The one or more carrier particles that are contained in the coated lactate particles of the present invention preferably have a particle size in the range of 40 to 600 µm, more preferably in the range of 45 to 550 µm, most preferably in the range of 50 to 500 µm.

According to a particularly preferred embodiment of the present invention, at least 50 wt. %, more preferably at least 60 wt. % and most preferably at least 70 wt. % of the coated lactate particles consists of agglomerated particles comprising at least 2 carrier particles.

Another aspect of the invention relates to a method of preparing a foodstuff or a beverage, said method comprising incorporating a particulate product as defined herein, in a concentration of 0.1 to 10% by weight, preferably 0.15 to 8% by weight of the foodstuff or the beverage.

The present method preferably comprises the step of distributing the particulate product throughout the foodstuff or of dispersing the particulate product throughout the beverage.

Preferably, the present method comprises incorporating the particulate product in a foodstuff.

According to a particularly preferred embodiment the foodstuff is a meat product, more preferably a processed meat product. Examples of processed meat products include:
- fresh processed meat products (e.g. hamburgers, fried sausage, kebab, chicken nuggets)
- cured meat pieces (e.g. raw cured beef, raw ham, cooked beef, cooked ham, reconstituted products and bacon)
- raw-cooked products (e.g. Frankfurter, mortadella, Lyoner and meat loaf)
- precooked-cooked products (e.g. liver sausage, blood sausage and corned beef)
- raw (dry)-fermented sausages (e.g. salami)
- dried meat Most preferably, the present method is applied in the preparation of a processed meat product selected from cured meat pieces and raw (dry)-fermented sausages.

Yet another aspect of the invention relates to process of producing the particulate product of the present invention, said process comprising:
- providing a fluidized bed of carrier particles containing at least 80 wt. % of calcium lactate component selected from calcium lactate hydrates, calcium lactate anhydrous and combinations thereof;
- spray coating the carrier particles by spraying the fluidized bed with an aqueous liquid containing at least 30 wt. % sodium lactate; and
- drying the spray coated carrier particles.

In a preferred embodiment of the production process, the carrier particles contain at least 80 wt. %, more preferably at least 90 wt. % of calcium lactate.

In a particularly preferred embodiment of the invention at least 80 wt. %, more preferably at least 90 wt. % of the carrier particles have diameter in the range of 40-600 µm, more preferably in the range of 45 to 550 µm, more preferably in the range of 50 to 500 µm.

The aqueous liquid that is employed in the aqueous process preferably contains at least 40 wt. %, preferably at least 50 wt. % of sodium lactate.

Drying of the spray coated particles is preferably achieved simultaneously with the spray coating by passing a stream of drying gas through the fluidized bed of particles. The drying gas employed is preferably selected from air, oxygen, nitrogen and combinations thereof.

Simultaneous spray coating and drying is preferably carried out using an drying gas temperature in the range of 50-160° C., more preferably in the range of 60-150° C. and most preferably in the range of 70-140° C.

Simultaneous spray coating and drying is preferably carried out at atmospheric or increased pressure, more preferably at a pressure of 1.5-4 bar, most preferably at a pressure of 2-3 bar.

The invention is further illustrated by means of the following non-limiting examples.

EXAMPLES

Example 1

Coated lactate particles according to the present invention were prepared in a GLATT® fluid bed dryer as described below.

The basket of the fluid bed dryer was filled with 160 kg of calcium lactate pentahydrate with an average diameter, D[4,3] of 240 µm (Puracal® PP, ex Corbion, the Netherlands). This starting material was heated up to 60° C. during fluidization of the product. Air flow speed was set at 2800 m$^3$/h.

A commercially available solution comprising about 60% sodium lactate (Purasal® S, ex Corbion, the Netherlands) was used as spraying liquid. Spraying was started when the fluidized bed had reached a temperature of 60° C. Air inlet temperature was set at 120° C. while the spray pressure was 3 bar. Initially spray rate was set at around 300 g/min which then was ramped up to 2,500 g/min over 4 hours of spraying after which the spraying was stopped. The product was cooled to 30° C. for about 25 minutes and collected in aluminum bags.

The properties of the powder so obtained are summarized in Table 1.

TABLE 1

| | |
|---|---|
| Calcium lactate | 39 wt. % |
| Sodium lactate | 58 wt. % |
| Sodium | 12.2 wt. % |
| Calcium | 7.3 wt. % |
| Lactate | 79.5 wt. % |
| Moisture | 2.7 wt. % |
| Tapped density | 0.78 g/ml |
| D[4, 3] | 570 μm |

SEM-EDX pictures were taken of the powder. These pictures demonstrated that the powder consisted of porous agglomerated particles of calcium lactate, enveloped and held together by sodium lactate.

Example 2

An experiment was conducted to compare the stability of the coated lactate powder of Example 1 with that of a dry mixture of anhydrous calcium lactate and sodium lactate of the same composition. The dry mixture was prepared as follows:

Puracal® PP was dried inside a fluid bed dryer for ±40 minutes at 80-100° C. followed by cooling to about 30° C. The resulting powder had a moisture content of 2.9% w/w (IR balance at 130° C.), indicating that the material was essentially anhydrous. The anhydrous calcium lactate so obtained was stored in a hermetically sealed packaging to avoid moisture uptake.

40 g of the anhydrous calcium lactate was blended with 60 g of Purasal powder S100 (ex Corbion Purac) in a securitainer jar. Next, the mixture was tumbled in a Turbula blender for 20 minutes. The final blend was collected in hermetically sealed packaging.

Hygroscopicity of the two powders was analysed using a Dynamic Vapor Sorption (DVS) Q5000SA (ex. TA instruments). The samples were subjected to a full cycle between 0% RH to 90% RH at 20° C. with conditions: next step if weight change (%) is less than 0.0100 for 5.00 min or after 500 min.

Table 2 shows the moisture uptake profile of the two powders at 20° C.

TABLE 2

| | Weight change (in %) | |
|---|---|---|
| RH (in %) | Dry mixture | Coated lactate powder |
| 0 | −2.026 | −1.818 |
| 10 | −1.894 | −1.803 |
| 20 | −1.739 | −1.539 |
| 30 | −1.473 | −0.914 |
| 40 | 16.54 | 14.43 |
| 50 | 31.38 | 25.63 |
| 60 | 47.49 | 40.76 |
| 70 | 72.49 | 66.16 |
| 80 | 114.9 | 101.2 |
| 90 | 195 | 160 |

These results show that the coated lactate powder is less hygroscopic than the physical mixture, particularly between 50% RH-90% RH.

In order to assess the practical impact of the observed difference in hygroscopicity, a closed cup test was performed at elevated temperature and humidity.

2 grams of the dry mixture and 2 grams of the coated lactate powder were transferred into different plastic cup containers (polypropylene). The plastic cups were closed and stored for 48 hours in a climate chamber set at 40° C./75% RH. After this storage period, the dry mixture sample suffered from deliquescence and lumping, whereas the coated lactate powder had a dry appearance and was still free flowing.

The invention claimed is:

1. A particulate product, comprising at least 10 wt. % of coated lactate particles 120 to 1,200 μm in size and comprising:
   (a) one or more carrier particles, comprising at least 80 wt. % of a calcium lactate component selected from calcium lactate hydrates, calcium lactate anhydrous and combinations thereof;
   (b) a coating layer that covers the one or more carrier particles, the coating layer comprising at least 60 wt. % of sodium lactate,
   wherein the lactate particles comprise sodium and calcium in a molar ratio of 2.1:1 to 5:1.

2. The particulate product according to claim 1, wherein the one or more carrier particles comprises at least 90 wt. % of calcium lactate.

3. The particulate product according to claim 1, wherein the coating layer comprises at least 70 wt. % of sodium lactate.

4. The particulate product according to claim 3, wherein the coating layer comprises at least 80 wt. % of sodium lactate.

5. The particulate product according to claim 1, wherein sodium and calcium are present in the coated lactate particles in a molar ratio of not more than 4.2:1.

6. The particulate product according to claim 1, wherein the combination of calcium lactate component and sodium lactate constitutes at least 80 wt. % of the coated lactate particles.

7. The particulate product according to claim 6, wherein the combination of calcium lactate component and sodium lactate constitutes at least 90 wt. % of the coated lactate particles.

8. The particulate product according to claim 1, wherein the coated lactate particles have a water content of less than 3.5 wt. %.

9. The particulate product according to claim 1, comprising at least 30 wt. % of the coated lactate particles.

10. The particulate product according to claim 1, further comprising 10 wt. % of acetate particles comprising at least 80 wt. % of alkali metal acetate.

11. The particulate product according to claim 1, further comprising 10 wt. % of propionate particles comprising at least 80 wt. % of alkali metal propionate.

12. The particulate product according to claim 1, comprising at least 80 wt. % of the coated lactate particles.

13. The particulate product according to claim 12, comprising at least 90 wt. % of the coated lactate particles.

14. The particulate product according to claim 1, having a bulk density in the range of 0.40-0.95 g/ml.

15. The particulate product according to claim 1, wherein the one or more carrier particles have a particle size in the range of 40 to 600 μm.

16. A method of preparing a foodstuff or a beverage, the method comprising incorporating a particulate product according to claim 1 in a concentration of 0.1, to 10% by weight of the foodstuff or the beverage.

17. A process of producing a particulate product according to claim 1, the process comprising:
   (a) obtaining carrier particles comprising at least 80 wt. % of calcium lactate component selected from calcium lactate hydrates, calcium lactate anhydrous and combinations thereof,
   (b) spray coating the carrier particles on a fluidized bed with an aqueous liquid comprising at least 30 wt. % sodium lactate; and
   (c) drying the spray coated carrier particles.

18. The process according to claim 17, wherein the aqueous liquid comprises at least 40 wt. % of sodium lactate.

19. The process according to claim 18, wherein the aqueous liquid comprises at least 50 wt. % of sodium lactate.

* * * * *